United States Patent
Kimura

[19]

[11] Patent Number: 6,160,608
[45] Date of Patent: *Dec. 12, 2000

[54] IMAGE RECORDING APPARATUS

[75] Inventor: Youichi Kimura, Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/163,308

[22] Filed: Sep. 30, 1998

[30] Foreign Application Priority Data

Sep. 30, 1997 [JP] Japan ................................ 9-265537

[51] Int. Cl.[7] ........................... G03B 27/32; G03B 29/00; G03B 27/52
[52] U.S. Cl. ........................... 355/29; 355/27; 355/40
[58] Field of Search ................................ 355/28, 29, 40, 355/41, 27; 396/613, 564

[56] References Cited

U.S. PATENT DOCUMENTS 4,924,256  5/1990  Yanatori .................................... 355/29
5,984,445  11/1999  Morita et al. ................................ 347/2

*Primary Examiner*—Russell Adams
*Assistant Examiner*—Hung Henry Nguyen
*Attorney, Agent, or Firm*—Birch, Stewart, Kolasch & Birch, LLP

[57] ABSTRACT

The improved image recording apparatus includes an imagewise exposing device by which recording light modulated in accordance with an image to be recorded is allowed to be incident in a specified recording position; an auxiliary scanning transport device by which a light-sensitive material cut to a specified length is transported in an auxiliary scanning direction as it is held in the recording position and which has a first nip transport device and a second nip transport device; a supply device for transporting the light-sensitive material to be supplied in an appropriate posture into the first nip transport device; and a transport control device for controlling the supply device and the first nip transport device. The image recording apparatus can correct any skew in the posture of light-sensitive materials just upstream of the recording position and without affecting their exposure so that they are supplied in the appropriate posture to the recording position, thereby ensuring consistent production of prints (photographs) that record a skewless appropriate image.

19 Claims, 2 Drawing Sheets

IMAGE RECORDING APPARATUS

BACKGROUND OF THE INVENTION

This invention relates to the technical field of an image recording apparatus that forms a latent image on light-sensitive materials (photographic papers) by scan exposure.

Heretofore, the image recorded on photographic films such as negatives and reversals (which are hereunder referred to simply as "films") has been commonly printed on light-sensitive materials by means of direct (analog) exposure, in which projected light from the film is allowed to be incident on the light-sensitive material to achieve its areal exposure.

A new technology has recently been introduced and this is a printer that relies upon digital exposure. Briefly, the image recorded on a film is read photoelectrically, converted to a digital signal and subjected to various image processing operations to produce image data for recording purposes; recording light that has been modulated in accordance with the image data is used to scan and expose a light-sensitive material to record a latent image, which is subsequently developed and output as a print (photograph). The printer operating on this principle has been commercialized as a digital photoprinter.

In the digital photoprinter, the image on a film is read photoelectrically and gradation correction and other operations are performed by subsequent image (signal) processing to determine exposing conditions. Hence, the digital photoprinter has many capabilities in image processing such as editing of printed images by, for example, assembling a plurality of images or splitting a single image into plural images, as well as color/density adjustment and edge enhancement; as a result, prints can be output as needed by specific uses. In addition, the data on a printed image can be supplied into a computer or the like and stored in recording media such as a floppy disk or a hard disk.

A further advantage of the digital photoprinter is that compared to the prints produced by the conventional method of direct exposure, those which are output by the digital photoprinter have better image quality in such aspects as resolution and color/density reproduction.

Having these features, the digital photoprinter is basically composed of an input machine having a scanner (image reader) and an image processor and an output machine having both an exposing device (image recording device) and a developing device.

In the scanner, projected light carrying the image recorded on a film is read photoelectrically with an image sensor such as a CCD sensor and the captured image is sent to the image processor as data for the image on the film (i.e., the image data signal). In the image processor, the image data from the scanner are subjected to specified image processing operations and the resulting output image data for image recording (i.e., exposing conditions) are sent to the exposing device.

In the exposing device, if it is of a type that relies upon exposure by scanning with an optical beam, the latter is modulated in accordance with the received image data and deflected in a main scanning direction as the light-sensitive material is transported in an auxiliary scanning direction perpendicular to the main scanning direction, whereby a latent image is formed as the result of scan exposure of the light-sensitive material with the optical beam and a back print is also recorded. In the developing device, the exposed light-sensitive material is subjected to development and other specified processing operations so as to output a print which reproduces the image that has been recorded on the film.

In the exposing device, whether it is in the digital photoprinter or an ordinary photoprinter that relies upon "direct" exposure, a virgin light-sensitive material is in the form of a magazine, i.e., a roll contained in a lightproof case. The light-sensitive material is withdrawn out of the magazine in the exposing device and further transported for exposure and other necessary steps.

In the ordinary photoprinter, the light-sensitive material being transported is not cut but remains a web as it is subjected to exposure, back print recording, development, rinse, drying and other necessary steps and only after these steps are complete, the light-sensitive material is cut to individual prints of a specified length.

This process requires that frame information (frame punches) for delineating individual frames (or prints) be formed before or during the exposure of the light-sensitive material. However, the portion of the light-sensitive material where the frame information is formed is simply a waste of space. In addition, frame information have to be formed by special means having a punch, a sensor or the like.

In the exposing device of a digital exposure type, the light-sensitive material must be transported for scanning in high precision and without stops in order to record images of high quality that are free from unevenness and other defects. In order to meet this need, the exposing device in the digital photoprinter is adapted to make a slack (loop) out of the light-sensitive material both upstream and downstream of the exposing position but this only increases the complexity of the transport zone for the light-sensitive material and the mechanism for its control.

Under the circumstances, an exposing device is desired that can be incorporated in a digital photoprinter and which is capable of exposing a light-sensitive material after it is cut to sheets corresponding to individual prints to be finally produced. In fact, this need has been satisfied commercially with an analog photoprinter.

In order to produce prints with appropriate image reproduction, the light-sensitive material has to be supplied to the recording (exposing) position in a skewless appropriate posture. As already mentioned, digital exposure involves two-dimensional scanning of the light-sensitive material with optical beams or the like that are deflected in the main scanning direction which is perpendicular to the auxiliary scanning direction in which the light-sensitive material is being transported. Therefore, if the light-sensitive material skews when it is supplied to the recording position, the main scanning line defined by the optical beams or the like also skews with respect to the light-sensitive material, reproducing a curved image on the final print.

To avoid this problem, the conventional image recording apparatus has a paper position regulating guide provided upstream of the auxiliary scanning transport means for regulating the direction of transport of the light-sensitive material as it is held in contact with an edge portion of the light-sensitive material. Since the light-sensitive material is transported as its end portion is held in contact with the paper position regulating guide, the light-sensitive material is directed by means of the guide so that the posture of the light-sensitive material is rendered appropriate before it is supplied to the recording position.

In this method of regulating the position of the light-sensitive material using the paper position regulating guide, any skew in the posture of the light-sensitive material is corrected by forcing it into contact with the guide. Therefore, if, in the case where the guide is placed just upstream of the exposing section, the light-sensitive material has to be moved by a substantial amount before it contacts the guide, the quality of the image on the final print may occasionally be affected adversely. Conversely, if the guide is placed remote from the recording position, the light-sensitive material may skew again while it is transported from the guide to the recording position.

Thus, it has been desired to develop an image recording apparatus that is capable of performing appropriate image-wise exposure in a consistent manner by supplying a light-sensitive material to the recording position in a skewless appropriate posture.

SUMMARY OF THE INVENTION

The present invention has been accomplished under these circumstances and has as an object providing an image recording apparatus that is capable of correcting any skew in the posture of light-sensitive materials just upstream of the recording position and without affecting their exposure so that they are supplied in the appropriate posture to the recording position, thereby recording skewless appropriate images in a consistent manner.

In order to attain this object, the invention provides an image recording apparatus comprising:

imagewise exposing means by which recording light modulated in accordance with an image to be recorded is allowed to be incident in a specified recording position extending in a main scanning direction;

auxiliary scanning transport means by which a sheet-like light-sensitive material cut to a specified length is transported in an auxiliary scanning direction perpendicular to said main scanning direction as it is held in said recording position and which has first nip transport means provided upstream of said recording position in the auxiliary scanning direction and second nip transport means provided downstream of said recording position in the auxiliary scanning direction;

supply means for transporting said light-sensitive material to be supplied in an appropriate posture into said first nip transport means; and transport control means for controlling said supply means and said first nip transport means of the auxiliary scanning transport means in such a way that said supply means is driven so as to transport the light-sensitive material into said first nip transport means which is at rest while nipping the light-sensitive material, transport of the light-sensitive material by said supply means is stopped at the point of time when it has been transported by a specified length greater than a distance between said supply means and said first nip transport means and when preparation for exposure by said imagewise exposing means is complete, the transport of the light-sensitive material by said first nip transport means and said supply means is started.

Preferably, the image recording apparatus further comprises vibration damping means, and said imagewise exposing means and said auxiliary scanning transport means are assembled into a unit which is rendered vibration-proof by said vibration damping means.

Preferably, the transport of the light-sensitive material by said auxiliary scanning transport means is referenced to the agreement between center of said recording position in the main scanning direction and center of the light-sensitive material and said supply means is a transport roller pair that has a smaller width than the minimal size of the light-sensitive material of interest in the main scanning direction and which is placed in such a way that the center in the axial direction agrees with the center of said recording position in the main scanning direction.

Preferably, a nipping force by which the light-sensitive material is nipped between individual rollers of the transport roller pair is adjustable.

Preferably, said supply means, and said first and second nip transport means are a transport roller pair which transports said light-sensitive material as it is nipped between individual rollers of said transport roller pair.

Preferably, said auxiliary scanning transport means further comprises a sensor which detects a position of said light-sensitive material in the main scanning direction and which is provided between said first nip transport means and said recording position, and said imagewise exposing means adjusts said recording position in the main scanning direction on the light-sensitive material in accordance with said position of said light-sensitive material in the main scanning direction detected by said sensor.

Preferably, said sensor detects at least one edge portion of the light-sensitive material and said sensor is a line sensor.

Preferably, said imagewise exposing means issues light beams deflected in the main scan direction as said recording light allowed to be incident in said recording position and controls a timing of start of recording with the recording light in accordance with said position of said light-sensitive material in the main scanning direction detected by said sensor.

DETAILED DESCRIPTION OF THE INVENTION

The image recording apparatus of the invention will now be described in detail with reference to the preferred embodiment shown in the accompanying drawings.

Figure 1:
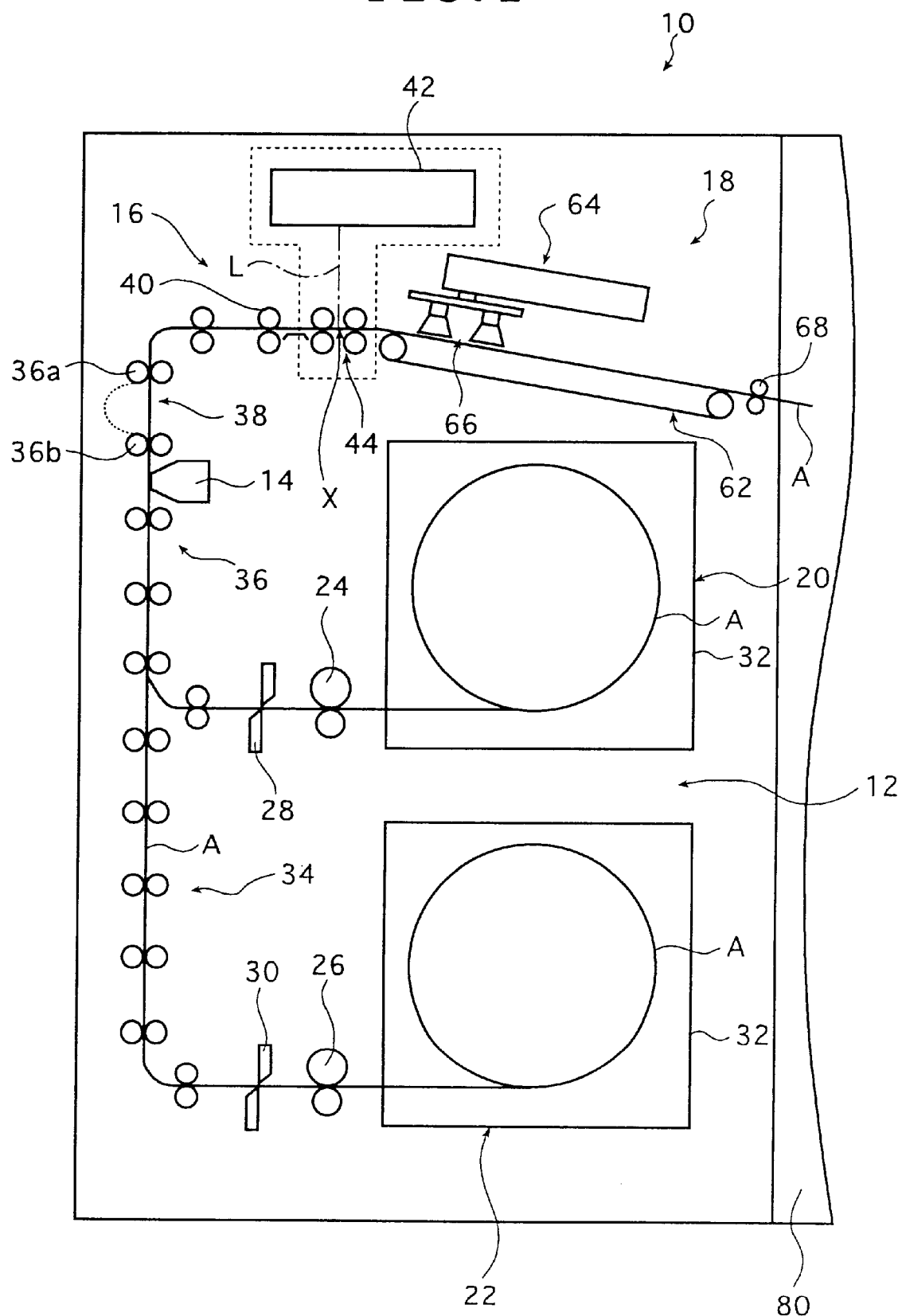
FIG. 1 shows in conceptual form a printer employing the image recording apparatus of the invention.

FIG. 1 shows in conceptual form a printer employing the image recording apparatus of the invention.

The printer indicated by 10 in FIG. 1 is used as the exposing device in the aforementioned digital photoprinter and a web of light-sensitive material (photographic paper) is cut to individual sheets of a specified length associated with the prints to be finally produced and, after back printing (recording of a back print) and digital scan exposure, the exposed sheets of the light-sensitive material are supplied to a processor (developing machine) 80.

Having these capabilities, the printer 10 comprises a light-sensitive material supply section 12, back printing means 14 for recording a back print, an image recording section 16 which exposes the light-sensitive material A in a recording (exposing) position X, and a distributing section 18.

It should be noted that, in addition to the illustrated components, means of transporting the light-sensitive material A such as transport rollers, transport guides, sensors and various other members are also incorporated, as required, in the printer 10.

Further referring to the printer 10, the light-sensitive material supply section 12 (hereinafter referred to as a "supply section 12") comprises loaders 20 and 22, withdrawing roller pairs 24 and 26, and cutters 28 and 30.

The loaders 20 and 22 are sites into which are loaded magazines 32 containing a roll of light-sensitive material A within a lightproof case, with the recording surface side facing outward. The magazines 32 to be loaded into both the loaders 20 and 22 are usually adapted to contain different types of light-sensitive material A which is characterized by their size (width), surface gloss (silk-finish, matte and so forth), specifications (e.g. thickness and base type), and so forth.

The withdrawing roller pair 24 or 26 is operated to withdraw the light-sensitive material A from the magazine 32 loaded into the corresponding loader 20 or 22 and the withdrawn light-sensitive material is transported. The transport stops at the point of time when the light-sensitive material A has been transported downstream from the corresponding cutter 28 or 30 by a length corresponding to each of the prints to be produced. Subsequently, the cutter 28 or 30 turns on to cut the light-sensitive material A to individual sheets of a specified length.

The light-sensitive material A taken out of the magazine 32 in the loader 22 and cut into individual sheets of a specified length by means of the cutter 30 is transported upward by means of the first transport section 34 and the second transport section 36, each consisting of a number of transport roller pairs. On the other hand, the light-sensitive material A taken out of the magazine 32 in the loader 20 and cut into individual sheets by means of the cutter 28 is transported upward by means of the second transport section 36. Subsequently, these sheets are both transported in the right direction to the image recording section 16 (particularly auxiliary scanning transport means 44) with the recording surface side facing upward.

The back printing means 14 is located in the middle of the second transport section 36.

The back printing means 14 is used to record on a non-record reverse surface of the light-sensitive material A (where no emulsion is coated) a back print consisting of various pieces of information, such as the date when the picture was taken, the date of printing (exposure), frame number, film identification (ID) number (code), ID number of the camera used to take the picture and ID number of the photoprinter. The light-sensitive material A is subjected to back print recording with the back printing means 14 as it is transported by means of the second transport section 36.

Examples of the back printing means 14 for recording a back print include back printers for use in known photoprinters such as an ink-jet printer, a dot impact printer and a thermal transfer printer. To be compatible with the recently developed Advanced Photo System, the back printing means 14 is preferably adapted to be capable of marking at least two lines at a time.

A loop forming area 38 is provided between the transport roller pairs 36a and 36b which are downstream of the back printing means 14 in the second transport section 36.

Thus, the transport speed of the light-sensitive material A in the second transport section 36 is set as follows: the speed in the transport roller pair 36a and subsequent components which are downstream of the loop forming area 38 is the same as the scanning transport speed in the image recording section 16 (auxiliary scanning transport means 44), whereas the speed in the transport roller pair 36b and prior components which are upstream of the loop forming area 38 is higher than the above scanning transport speed. The light-sensitive material A transported through the second transport section 36 forms a loop in the loop forming area 38 in accordance with its size based on the difference in the upstream/downstream transport speed, as shown by the dotted line in FIG. 1.

In the illustrated printer 10, this configuration enables the separation of the back printing means 14 from the image recording section 16 with a short pathlength, whereby a highly precise scanning and transport of the light-sensitive material A in the course of exposure is realized.

Figure 2A:
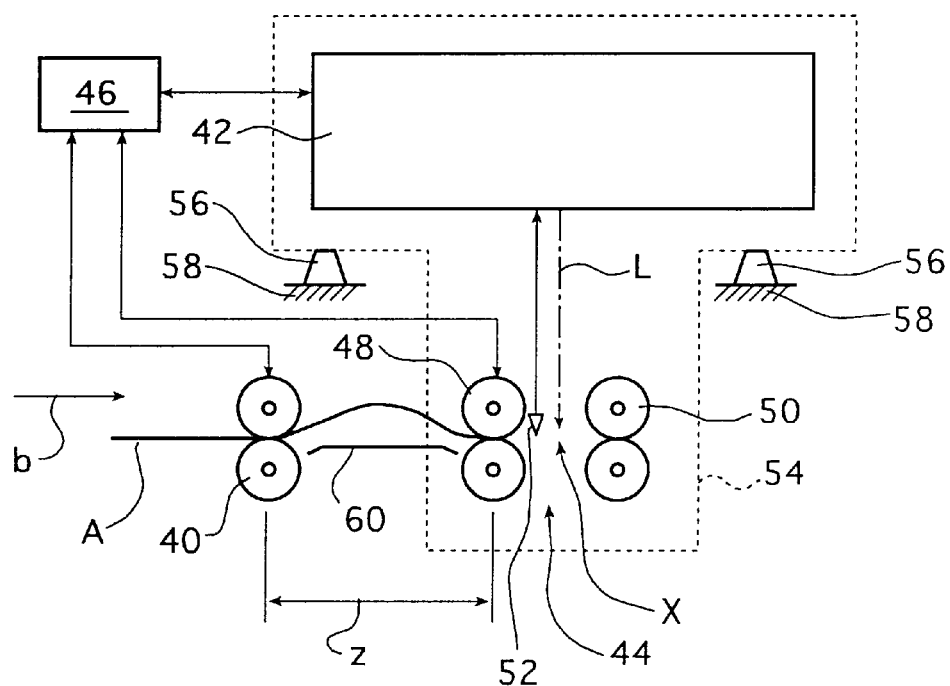
FIG. 2a is a diagrammatic side view of an example of the image recording apparatus of the invention for use in the printer shown in FIG. 1.
Figure 2B:
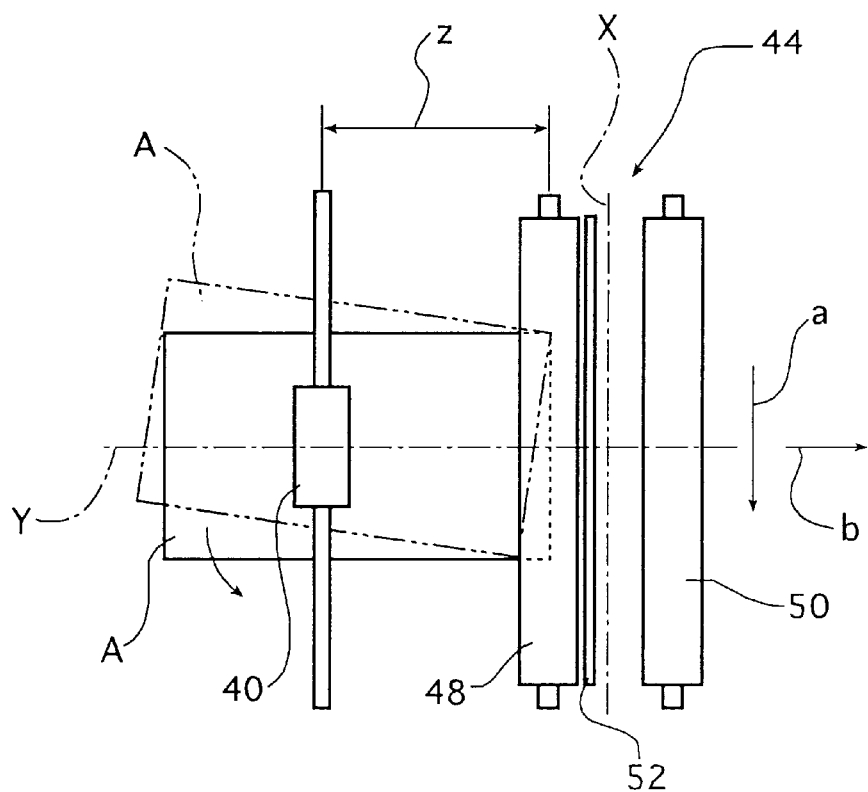
FIG. 2b is a diagrammatic plan view of the same example of the image recording apparatus.

The image recording section 16 comprises a supply roller pair 40, an exposing unit 42, the auxiliary scanning transport means 44 and a transport control means 46 (see FIG. 2). In the image recording section 16, the light-sensitive material A coming from the second transport section 36 is transported into the auxiliary scanning transport means 44 with the supply roller pair 40 and, at the same time, corrected for any skew as will be described hereinafter to have the appropriate posture; thereafter, as the light-sensitive material A is held in a specified recording position X and transported in the auxiliary scanning direction (indicated by arrow b in FIGS. 2a and 2b), the recording light L, modulated in accordance with the image data (the image to be recorded) and emitted from the exposing unit 42, is allowed to be incident on the recording position X (main scanning line) extending in the main scanning direction which is perpendicular to the auxiliary scanning direction (and which is normal to the plane of FIGS. 1 and 2a and indicated by arrow a in FIG. 2b), whereupon the light-sensitive material A is exposed by two-dimensional scanning to form a latent image on it.

It should be noted that the illustrated image recording section 16 performs basically center-referenced exposure by side registering (regulating the edge position) of the light-sensitive material A such that its center in the main scanning direction agrees with the center Y of the recording position X in the main scanning direction. Therefore, the light-sensitive material A is basically transported into the supply roller pair 40 in such a way that its center in a direction perpendicular to the direction of transport (which is hereinafter referred to as the "direction of width") agrees with the center Y in the main scanning direction.

FIGS. 2a and 2b show diagrammatically the image recording section 16 in a side view and in a plan view from which the exposing unit 42 and the transport control means 46 are omitted, respectively.

The supply roller pair 40 is such that the light-sensitive material A coming from the second transport section 36 is transported in the auxiliary scanning direction to be supplied into the auxiliary scanning transport means 44 at the same speed (or a slightly higher speed) than the latter as it is nipped between the individual rollers.

In a preferred embodiment of the illustrated case, the supply roller pair 40 has a smaller width than the minimal size of the light-sensitive material A of interest in the direction of width and it is placed in such a way that the center in the axial direction agrees with the center in the main scanning direction. This arrangement facilitates the rotation of the light-sensitive material A which will be described later in the specification. The force by which the light-sensitive material A is nipped between the individual rollers of the supply roller pair 40 may basically be the same as the force exerted by the other transport roller pairs represented by the auxiliary scanning transport means 44. If desired, in order to facilitate the rotation of the light-sensitive material A, the nipping force of the supply roller pair 40 is adjustable within the range over which the transport of the light-sensitive material A to be described later can be insured. Any suitable manner of adjusting the nipping force of the supply roller pair 40 may be employed.

The drive of the supply roller pair 40 is controlled by the transport control means 46. A transport guide 60 is provided between the supply roller pair 40 and the auxiliary scanning transport means 44.

The exposing unit 42 in the illustrated case may be a known optical beam scanner using the light beams including laser beam as the recording light L. The exposing unit 42 may typically be composed of light sources which issue optical beams for exposing the light-sensitive material A with red (R), green (G) and blue (B) lights, modulating means such as AOM (acoustic optical modulator) which modulates the light beams issued from the light sources in accordance with digital image data, a light deflector such as a polygonal mirror which deflects the modulated light beams in a main scanning direction, an fθ (scanning) lens with which the light beams deflected in the main scanning direction are focused to form beam spot of a specified diameter at a specified point in the recording position X in cooperation with specified beam optics, and so forth.

Aside from the exposing unit 42 just described above, the present invention permits the use of various kinds of digital exposing means using various arrays of light-emitting devices and spatial modulating devices which extend in a direction perpendicular to the direction in which the light-sensitive material A is transported for scanning. Specific examples of such arrays include a PDP (plasma display) array, an ELD (electroluminescent display) array, an LED (light-emitting diode) array, an LCD (light-crystal display) array, a DMD (digital micromirror device) array, and a laser array.

The auxiliary scanning transport means 44 comprises two transport roller pairs 48 and 50 that are provided on opposite sides of the recording position X (scanning line) for transporting the light-sensitive material A as it is nipped between the individual rollers, and an exposure guide (not shown) to hold more precisely the light-sensitive material A in the recording position X. The first transport roller pair 48 is positioned upstream of the recording position X and the second transport roller pair 50 is positioned downstream of the recording position X. The auxiliary scanning transport means 44 transports the light-sensitive material A for scanning in the auxiliary scanning direction perpendicular to the main scanning direction while it is held in the recording position X. As already mentioned, the light beams as the recording light L are deflected in the main scanning direction, so the light-sensitive material A is exposed by two-dimensional scanning with the recording light L modulated in accordance with the image data to thereby form a latent image on the material.

The drive of the auxiliary scanning transport means 44 is controlled by the transport control means 46.

Two transport roller pairs that are provided on opposite sides of the recording position X as in the illustrated case are not the sole example of the auxiliary scanning transport means. Another example of the auxiliary scanning transport means is by using an exposing drum that transports the light-sensitive material A as it is held in the recording position X and two nip rollers which are provided on opposite sides of the recording position X in such a way that they are held in contact with the exposing drum. In short, various means of transporting sheetings can be employed as long as the transport means positioned upstream of the recording position X is of a type that transports the light-sensitive material A as it is nipped between the individual elements.

A line sensor 52 is provided between the first transport roller pair 48 and the recording position X. The line sensor 52 detects the position of the light-sensitive material A in the main scanning direction by typically sensing at least one edge portion of the light-sensitive material in the main scanning direction. As will be described later in detail, the exposing unit 42 adjusts the recording really exposing position in the main scanning direction on the light-sensitive material on the basis of the result of the detection.

There is no particular limitation on the line sensor 52 that can be employed in the invention and various known sensors including optical sensors and mechanical sensors that are activatable as by touching may be employed as long as they can detect the position of sheetings.

In the illustrated image recording section 16, the exposing unit 42 and the auxiliary scanning transport means 44 are assembled into a unit 54 by a known method and the unit 54 is supported on the frame 58 of the printer 10 with vibration damping means 56 interposed.

This structural design ensures that the vibrations from the action of the aforementioned cutters 28 and 30 or any external vibrations will not be transmitted to the exposing unit 42 and the auxiliary scanning transport means 44 so that these vibrations will not cause any offset in the relative positions of the exposing unit 42 and the auxiliary scanning transport means 44, or any offset in the position of the light-sensitive material A, or unevenness in transport in the auxiliary scanning direction, whereby the unevenness in image that would otherwise occur can be effectively prevented to achieve consistent recording of high-quality images.

The vibration damping means 56 also is not limited in any particular way and various known types of means are useful if they can prevent, absorb, insulate or reduce the transmission of internal vibrations from the frame 58 to the unit 54. Examples that can be used are elastic members such as vibration-insulating rubbers, corks, pneumatic springs and metal springs that will not cause self-induced vibrations but have a great ability to absorb energy under the spring action, as well as dynamic dampers that employ these elastic members. The vibration-damping means mentioned above may be used either alone or in combination, as exemplified by the combination of a vibration-insulating rubber with a spring (coil spring).

As already mentioned, the drive of the supply roller pair 40 and the auxiliary scanning transport means 44 is controlled by the transport control means 46.

On the pages that follow, the image recording apparatus of the invention is described in greater detail with particular reference to the action of the transport control means 46 (which is hereinafter referred to as "control means 46") and the image exposing section 16.

As already mentioned, when the light-sensitive material A has been transported from the second transport section 36 into the image recording section 16, the control means 46 controls the supply roller pair 40 in such a way that the supply roller pair 40 is driven so as to transport the light-sensitive material A into the auxiliary scanning transport means 44 (specifically the first transport roller pair 48), correct any skew of the light-sensitive material A in conjunction with the first transport roller pair 48 of the auxiliary scanning transport means 44 and supply the light-sensitive material A to the first transport roller pair 48 in an appropriate posture after any skew thereof has been corrected. On this occasion, the control means 46 also controls the first transport roller pair 48 in such a way that the first transport roller pair 48 is not driven, but is at rest with the individual rollers being held in contact with each other as in the case where the light-sensitive material A is nipped between the individual rollers.

On the other hand, the transport of the light-sensitive material A by means of the supply roller pair 40 is controlled by the control means 46 in such a way that the transport stops at the point of time when a specified length of the light sensitive material A has been transported. The specified length is set as an amount of transport consisting of the distance z between the supply roller pair 40 and the first transport roller pair 48, plus a suitable amount $\alpha$.

As just mentioned above, the individual rollers of the first transport roller pair 48 are held in contact with each other as in the case where the light-sensitive material A is nipped therebetween; in addition, the light-sensitive material A such as the photographic paper on which the original picture or image is to be reproduced, has a thick gage. Therefore, the advancing end of the light-sensitive material A being transported by the supply roller pair 40 will not move any further but stops when it has struck against contact portion of the individual rollers of the first transport roller pair 48 being held in contact with each other, that is, nip portion for nipping the light-sensitive material A between the individual rollers; then, as shown in FIG. 2a, the light-sensitive material A becomes slack (forms a loop) in an amount dependent on the value of $\alpha$.

Suppose here that the light-sensitive material A being transported from the second transport section 36 skews as shown in FIG. 2b. The most advancing corner of the light-sensitive material A strikes against the contact portion of the individual rollers of the first transport roller pair 48 being held in contact with each other and if it continues to be moved forward by the supply roller pair 40, it rotates about the most advancing corner in contact with the contact portion of the first transport roller pair 48 as it is transported by means of the supply roller pair 40, whereupon the skew of the light-sensitive material A is corrected with reference to the first transport roller pair 48 so that it assumes the appropriate posture, with the advancing side being parallel to the recording position (scanning line) X. It is worth particular mention that in the illustrated apparatus, the supply roller pair 40 is of a sufficiently narrow width to facilitate the rotation of the light-sensitive material A, thereby permitting its posture to be modified in an efficient way.

The suitable amount $\alpha$ which is to be added to the distance z to set a specified length of transport by the supply roller pair 40 is in no way limited and depending upon various factors such as the greatest skew of the light-sensitive material A that can be thought of, the corresponding minimal size of the light-sensitive material A in the direction of transport and the distance z, a suitable distance may be determined to ensure that the posture of the light-sensitive material A can be positively modified by moving it forward by means of the supply roller pair 40.

When the supply roller pair 40 has finished transporting the light-sensitive material A by a specified length as described above, the control means 46 waits for the exposing unit 42 to complete the preparation for exposure. When a signal indicating that the preparation for exposure is complete is received or read from the exposing unit 42, the control means 46 drives the supply roller pair 40 and the first transport roller pair 48 (and optionally the second transport roller pair 50). The start of this drive provides a reference for the detection of the recording start position in the auxiliary scanning direction (i.e., the detection of the advancing end of the light-sensitive material A).

When the advancing end of the light-sensitive material A has reached the recording position X, the optical beams modulated in accordance with the image to be recorded and that have been deflected in the main scanning direction are emitted from the exposing unit 42 and the light-sensitive material A which is being transported in the auxiliary scanning direction by the auxiliary scanning transport means 44 is exposed by two-dimensional scanning with the optical beams to record a latent image.

As already mentioned, the line sensor 52 is provided between the first transport roller pair 48 and the recording position X and detects the position of the light-sensitive material A in the main scanning direction when it is passed by the advancing end of the light-sensitive material A; the position of recording with the exposing unit 42 in the main scanning direction is adjusted on the basis of the result of the detection.

As already mentioned, the exposure to be performed in the image recording section 16 is basically center-referenced. However, as also mentioned above, if the light-sensitive material A skews during transport through the image recording section 16, its posture is modified by rotation with reference to the first transport roller pair 48; as a result, the light-sensitive material A will be positionally offset in the main scanning direction and the center of the light-sensitive material A transported to the recording position X may sometimes fail to coincide with the center in the main scanning direction.

It should also be noted that the exposing unit 42 and the auxiliary scanning transport means 44 are assembled into the unit 54, which is rendered vibration-proof by the vibration damping means 56. Therefore, if the light-sensitive material A is supplied into the first transport roller pair 48 when the supply roller pair 40 has been externally or otherwise vibrated, the light-sensitive material A will again experience a positional offset so that its center may sometimes fail to coincide with the center in the main scanning direction.

To deal with these situations, the illustrated apparatus uses the line sensor 52 to detect the position of the light-sensitive material A in the main scanning direction as it is transported to the recording position X and the position of recording (really exposing) with the exposing unit 42 in the main scanning direction is accordingly adjusted by, for example, controlling the timing of start of recording with the optical beams modulated in the main scanning direction.

This way, one can achieve consistent production of prints that record the appropriate image having no positional offsets.

Aside from the control of the timing of start of recording, various known methods may be employed to adjust the recording position to compensate for any positional offset of the light-sensitive material A.

The light-sensitive material A having a latent image recorded thereon by passage through the image recording section 16 is subsequently transported to the distributing section 18 located downstream of the image recording section 16. The distributing section 18 receives the light-sensitive material A ejected from the auxiliary scanning transport means 44 in the image recording section 16 and, according to a sequence appropriately determined by the size of the light-sensitive material A and other factors, distributes individual sheets of the light-sensitive material A in a lateral direction which is perpendicular to the direction of their transport so as to form a plurality of rows that overlap in the transport direction; the sheets are then transported to a transport roller pair 68, through which the light-sensitive material A is supplied to the processor 80. As a result, the throughput of the processor 80 can be improved, almost doubled in two rows and tripled in three rows.

The illustrated distributing section 18 comprises a belt conveyor 62 and a distributing device 64. The light-sensitive material A exposed in the image recording section 16 is ejected onto the belt conveyor 62, which carries the exposed light-sensitive material A to a specified position, whereupon it is lifted by sucker units 66 in the distributing device 64 and transported obliquely downstream to be set aside to either right or left; the light-sensitive material A is replaced on the belt conveyor 62 and transported as such to be fed through the transport roller pair 68.

As already mentioned, the sheets of light-sensitive material A transported by the distributing section 18 are further transported by the transport roller pair 68 into the processor 80, where they are subjected to the necessary steps of processing including color development, bleach-fixing and rinsing, and thereafter dried to produce finished prints, which emerge from the processor.

While the image recording apparatus of the present invention has been described above in detail, it should be noted that the invention is by no means limited to the foregoing cases and various improvements and modifications may of course be made without departing from the scope and spirit of the invention.

As described above in detail, the image recording apparatus of the invention can correct any skew in the posture of light-sensitive materials just upstream of the recording position and without affecting their exposure so that they are supplied in the appropriate posture to the recording position, thereby ensuring consistent production of prints (photographs) that record a skewless appropriate image.

What is claimed is:

1. An image recording apparatus comprising:
    imagewise exposing means by which recording light modulated in accordance with an image to be recorded is allowed to be incident in a recording position having a specified exposure width extending in a main scanning direction;
    auxiliary scanning transport means by which a sheet-like light-sensitive material cut to a specified length is transported in an auxiliary scanning direction perpendicular to said main scanning direction and which has first nip transport means provided upstream of said recording position in the auxiliary scanning direction and second nip transport means provided downstream of said recording position in the auxiliary scanning direction;
    supply means for transporting said light-sensitive material into said first nip transport means and correcting any skew of the light-sensitive material with respect to the first nip transport means; and
    transport control means for controlling said supply means and said first nip transport means in such a way that the first nip transport means is at rest in a state of being able to nip the light-sensitive material and said supply means is driven so as to transport the light-sensitive material into said first nip transport means which is at rest, and for continuing to drive said supply means after an advancing corner of the light-sensitive material has contacted the first nip transport means to thereby correct said any skew in conjunction with and with respect to said first nip transport means which is at rest, and supply to the first nip transport means the light-sensitive material said any skew of which has been corrected.

2. The image recording apparatus according to claim 1, further comprising vibration damping means, wherein said imagewise exposing means and said auxiliary scanning transport means are assembled into a unit, said unit being supported by a frame of said image recording apparatus via said vibration damping means.

3. The image recording apparatus according to claim 1, wherein said supply means is a transport roller pair that has a smaller width than a minimal width of the light-sensitive material of interest in the main scanning direction and which is placed along the main scanning direction.

4. The image recording apparatus according to claim 3, wherein a nipping force by which the light-sensitive material is nipped between individual rollers of the transport roller pair is adjustable.

5. The image recording apparatus according to claim 1, wherein each of said supply means, and said first and second nip transport means are a transport roller pair which transports said light-sensitive material as it is nipped between individual rollers of said transport roller pair.

6. The image recording apparatus according to claim 1, wherein said auxiliary scanning transport means further comprises a sensor which detects a position of said light-sensitive material in the main scanning direction and which is provided between said first nip transport means and said recording position.

7. The image recording apparatus according to claim 6, wherein said sensor detects at least one edge portion of the light-sensitive material.

8. The image recording apparatus according to claim 6, wherein said sensor is a mechanical sensor.

9. The image recording apparatus according to claim 6, wherein said imagewise exposing means issues light beams deflected in the main scanning direction as said recording light allowed to be incident in said recording position, and controls a timing of start of recording with the recording light in accordance with said position of said light-sensitive material in the main scanning direction detected by said sensor.

10. The image recording apparatus according to claim 1, wherein said transport control means stops transport of the light-sensitive material by said supply means at a point in time when the light-sensitive material has been transported by a specified length greater than a distance between said supply means and said first nip transport means.

11. The image recording apparatus according to claim 10, wherein said transport control means starts transport of the light-sensitive material by said first nip transport means and said supply means when preparation for exposure by said imagewise exposing means is complete.

12. The image recording apparatus according to claim 6, wherein said imagewise exposing means adjusts a timing of start of recording in the main scanning direction on said recording position in accordance with said position of said light-sensitive material in the main scanning direction detected by said sensor.

13. The image recording apparatus according to claim 6, wherein said sensor is an optical sensor.

14. The image recording apparatus according to claim 2, wherein said vibration damping means comprises elastic members attached between said frame and said unit.

15. The image recording apparatus according to claim 6, wherein said image exposing means adjusts a timing of start of recording in width in such a way that center of said specified exposure width on the recording position agrees with center of the light-sensitive material in the main scanning direction.

16. The image recording apparatus according to claim 1, wherein said auxiliary scanning transport means transports said light-sensitive material in such a way that center of said specified exposure width on the recording position by means of said image exposing means agrees with center of the light-sensitive material a position of which has been regulated in the main scanning direction and which has had no skew at the supply means.

17. The image recording apparatus according to claim 16, wherein said supply means is a transport roller pair that has a smaller width than a minimal width of the light-sensitive material of interest in the main scanning direction and which is placed centrally in an axial direction of the transport roller pair along the main scanning direction.

18. The image recording apparatus according to claim 1, wherein said specified exposure width is set in accordance with a width of said light-sensitive material.

19. The image recording apparatus according to claim 1, wherein said supply means is a transport roller pair that has a smaller width than a minimal width of the light-sensitive material of interest in the main scanning direction and which is placed in an axial direction along the main scanning direction, wherein said first and second nip transport means are a first and second transport roller pairs each of which transports said light-sensitive material as it is nipped between individual rollers of each of said first and second transport roller pairs and wherein transport control means for controlling said supply roller pair and said first transport roller pair in such a way that said supply roller pair is driven so as to transport the light-sensitive material into said first transport roller pair which is at rest, allow a most advancing corner of the light-sensitive material having said any skew to strike against a contact portion of the individual rollers of the first transport roller pair being held in contact with each other and being at rest, allow the light-sensitive material having said any skew to rotate about said most advancing corner, correct said any skew of the light-sensitive material with respect to the first transport roller pair and supply to the first transport roller pair the light-sensitive material said any skew of which has been corrected.

* * * * *